(12) United States Patent
Pickett et al.

(10) Patent No.: US 7,932,336 B2
(45) Date of Patent: Apr. 26, 2011

(54) TULIPALIN COPOLYMERS

(75) Inventors: James Pickett, Schenectady, NY (US); Qing Ye, Los Gatos, CA (US); Daniel Steiger, Bedminster, NJ (US)

(73) Assignee: SABIC Innovative Plastics IP, B.V., Bergen op Zoom (NL)

( * ) Notice: Subject to any disclaimer, the term of this patent is extended or adjusted under 35 U.S.C. 154(b) by 0 days.

(21) Appl. No.: 12/277,373

(22) Filed: Nov. 25, 2008

(65) Prior Publication Data

US 2009/0143553 A1 Jun. 4, 2009

Related U.S. Application Data

(63) Continuation of application No. 11/289,928, filed on Nov. 30, 2005, now Pat. No. 7,465,498.

(51) Int. Cl.
*C08F 134/02* (2006.01)
(52) U.S. Cl. ............. 526/266; 526/270; 526/328.5; 526/329.3; 526/329.6; 526/342; 526/347

(58) Field of Classification Search .......... 526/266, 526/270, 328.5, 329.2, 329.3, 329.6, 342, 526/347

See application file for complete search history.

(56) References Cited

U.S. PATENT DOCUMENTS

| | | | |
|---|---|---|---|
| 2003/0130414 A1* | 7/2003 | Brandenburg et al. | ....... 524/592 |
| 2004/0230019 A1 | 11/2004 | Brandenburg | |
| 2005/0031835 A1 | 2/2005 | Overholt et al. | |
| 2005/0101731 A1 | 5/2005 | Brandenburg et al. | |

OTHER PUBLICATIONS

Akkapeddi et al. Polymer (1979), 20(10), 1215-16.*

* cited by examiner

*Primary Examiner* — Bernard Lipman

(57) ABSTRACT

Copolymers are disclosed comprising structural units derived from α-methylene-γ-butyrolactone, styrene, methyl methacrylate and acrylonitrile. The copolymers may be used as protective layers in multilayer articles that include UV sensitive substrate materials. The multilayer articles may also include a silicone hardcoat.

16 Claims, 1 Drawing Sheet

TULIPALIN COPOLYMERS

CROSS-REFERENCE TO RELATED APPLICATIONS

Figure 1:
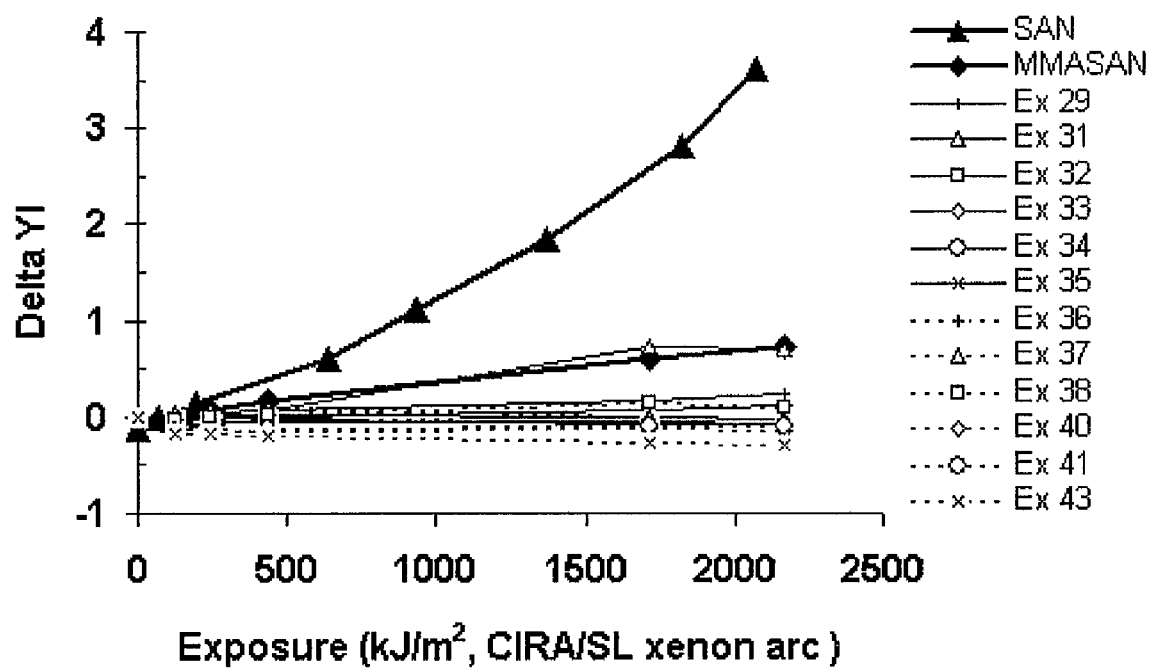

This application is a continuation application of application Ser. No. 11/289,928, filed Nov. 30, 2005, now U.S. Pat. No. 7,465,498, which is incorporated herein by reference.

BACKGROUND

The invention relates generally to copolymers of α-methylene-γ-butyrolactone with methyl methacrylate, styrene and acrylonitrile.

Polymers made from tulipalin, or α-methylene-γ-butyrolactone (MBL), have been known for more than 50 years (U.S. Pat. No. 2,624,723).

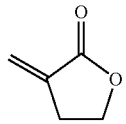

MBL is called tulipalin because it is present in relatively high concentration in white tulips. The homopolymer is a brittle glassy material with a glass transition temperature ($T_g$) of 195° C. (Macromolecules 12, 546 (1979)). The monomer can be viewed as a cyclic analogue of methyl methacrylate, and its reactivity in free radical polymerizations is comparable or even higher than methyl methacrylate (Akkapeddi, et al., Journal of Polymer Science: Polymer Chemistry Edition, v 20, 2819, (1982) and Polymer, vol. 20, 1215, (1979)). The increase in free radical reactivity presumably comes from the ring strain of the molecule.

MBL readily copolymerizes with styrene and (meth)acrylate monomers, and copolymers with (meth)acrylate esters, acrylonitrile and styrene have been reported (Journal of Polymer Science: Polymer Chemistry Edition, v 20, 2819 (1982)). JP 9033736 discloses clear, heat-resistant resins composed of copolymers of MBL with (meth)acrylate monomers. U.S. Pat. No. 5,880,235 discloses MBL copolymers for producing cast glass and thermal dimensionally stable molding materials. U.S. Pat. No. 6,642,346 discloses compositions that include MBL copolymers for automotive clear coats and clear coat finishes. The patent teaches that introduction of an exomethylene lactone or lactam imparts enhanced mar and scratch resistance to the finishes (col. 1, lines 63-65). U.S. Pat. No. 6,723,790 discloses blends of MBL copolymers with other polymers. U.S. Pat. No. 6,841,627 discloses MBL graft copolymers and blends of the copolymers with thermoplastic resins in order to obtain good optical properties and heat and weathering resistance. US 2003/0130414 describes compositions of MBL copolymers filled with alumina trihydrate for decorative sheets and articles The compositions possess thermal resistance, hardness, scratch and mar resistance, antimicrobial properties, lower coefficient of thermal expansion, high refractive index and high transparency. None of the references mention copolymers of MBL with styrene and methyl methacrylate (MMA) that have high Tg, weatherability and solvent resistance.

BRIEF DESCRIPTION

It has been unexpectedly discovered that the copolymers of MBL with styrene and methyl methacrylate and of MBL with styrene, methyl methacrylate, and acrylonitrile have excellent weathering and vastly improved solvent resistance. $T_g$ is much higher than the corresponding polymers made with styrene and acrylonitrile (SAN) alone or styrene, acrylonitrile, and methyl methacrylate (MMA-SAN). A highly weatherable multilayer article may be constructed therefrom.

Accordingly, in some embodiments, the present invention relates to copolymers that comprise structural units derived from α-methylene-γ-butyrolactone, styrene, methyl methacrylate and acrylonitrile. The copolymers have glass transition temperatures ranging from about 110° C. to about 175° C.

DRAWINGS

FIG. 1 is a graph showing weatherability of MBL copolymers in comparison with a styrene-acrylonitrile copolymer or a copolymer of styrene, acrylonitrile and methyl methacrylate.

DETAILED DESCRIPTION

In one aspect, the present invention relates to copolymers comprising structural units derived from α-methylene-γ-butyrolactone, styrene and methyl methacrylate and to copolymers comprising structural units derived from α-methylene-γ-butyrolactone, styrene, methyl methacrylate and acrylonitrile. The copolymers typically have glass transition temperatures ranging from about 110° C. to about 175° C., particularly from about 120° C. to about 150° C. In the MBL copolymers, the amount of structural units derived from α-methylene-γ-butyrolactone ranges from about 10% by weight to about 75% by weight, particularly from about 20% by weight to about 50% by weight, and more particularly from about 20% by weight to about 35% by weight. The amount of structural units derived from styrene ranges from about 20% by weight to about 80% by weight, particularly about 20% by weight to about 50% by weight, and more particularly from about 25% by weight to about 40% by weight. The amount of structural units derived from methyl methacrylate ranges from about 5% by weight to about 50% by weight, particularly from about 10% by weight to about 45% by weight, and more particularly from about 15% by weight to about 45% by weight. For copolymers containing structural units derived from acrylonitrile, the amount of such units ranges from 5% by weight to about 40% by weight, and particularly from about 5% by weight to about 35% by weight. For all copolymers where amounts are expressed as % by weight, the amount is based on total copolymer weight. Incorporation of MBL in an MMA-SAN polymer typically improves weathering while simultaneously increasing Tg and improving chemical resistance, without imparting a yellow color upon melt processing.

Any of the known methods for polymerizing styrene and/or (meth)acrylate monomers may be used to prepare the α-MBL copolymers. However, bulk and solution polymerization processes, using solvents such as γ-butyrolactone, toluene, NMP, DMF and DMSO, are particularly suitable.

In other embodiments, the present invention relates to multilayer articles comprising a protective layer disposed on a substrate. The protective layer includes a copolymer of α-methylene-γ-butyrolactone with methyl methacrylate, styrene and/or acrylonitrile, and particularly MBL copolymers as described above. The protective layer is typically disposed directly on the substrate, but in some cases, it may be desirable to laminate the protective layer to the substrate by use of an adhesive or primer layer.

The protective layer may include additives such as fillers (clay, talc, etc.), reinforcing agents (glass fibers), impact modifiers, plasticizers, flow promoters, lubricants and other processing aids, stabilizers, antioxidants, antistatic agents, colorants, mold release agents, flame retardants, antioxidants, hindered amine light stabilizers, and/or UV absorbing agents (UVA). Suitable UVAs include hydroxybenzophenones, hydroxyphenyl benzotriazoles, hydroxyphenyl triazines, cyanoacrylates, oxanilides, benzoxazinones; and particulate inorganic materials such as titanium oxide, cerium oxide, and zinc oxide, having a particle size less than about 100 nanometers. Other UVAs known in the art and disclosed in standard reference works such as "Plastics Additives Handbook", 5th edition, edited by H. Zweifel, Hanser Publishers, may also be used. Mixtures of UVAs may be particularly effective, especially mixtures of the abovementioned agents. In a particular embodiment, the UVA is 2-(4,6-diphenyl-1,3,5-triazin-2-yl)-5-hexyloxy-phenol, sold by CIBA® as TINUVIN® 1577.

The amount of UVA for use in the protective layer ranges from about 0.0005 wt. % to about 10 wt. %, particularly from about 0.001 wt. % to about 10 wt. %, and more particularly from about 0.1 wt. % to about 5 wt. %, based on the total weight of polymer in the protective layer. The thickness of the protective layer in multilayer articles typically ranges from about 2µ to about 2,500µ, preferably from about 10µ to about 500µ and most preferably from about 50µ to about 250µ.

Substrates for use in the multilayer articles in various embodiments of the present invention are materials that are sensitive to UV radiation, i.e., they undergo some undesirable change upon exposure to UV radiation. The undesirable change is typically a change in color, but chemical and mechanical properties of the substrate may be affected as well. The UV sensitive materials include thermoplastic and thermoset polymers and copolymers and blends thereof. Suitable thermoplastic polymers include polycarbonates, particularly aromatic polycarbonates, polyacetals, polyarylates, polyarylene ethers, including polyphenylene ethers, polyarylene sulfides, including polyphenylene sulfides, polyimides, including polyamideimides, polyetherimides, polyetherketones, including polyaryletherketones, polyetheretherketones, polyetherketoneketones, polyamides, polyesters, including liquid crystalline polyesters, polyetheresters, polyetheramides, polyesteramides, and polyestercarbonates, aliphatic olefin and functionalized olefin polymers, including polyethylene, polypropylene, thermoplastic polyolefin (TPO), ethylene-propylene copolymer, polyvinyl chloride, poly(vinyl chloride-co-vinylidene chloride), polyvinyl fluoride, polyvinylidene fluoride, polyvinyl acetate, polyvinyl alcohol, polyvinyl butyral, polyacrylonitrile, (meth)acrylate polymers and copolymers including polymethyl methacrylate (PMMA), and polymers and copolymers of vinylaromatic monomers including acrylonitrile-butadiene-styrene copolymer (ABS) and acrylonitrile-styrene-acrylate (ASA). In particular, the substrate may be one or more homo- or co-polycarbonate, or a polycarbonate blend, or a blend of polycarbonate with other polymers, for example, blends of polycarbonates with polyesters, ABS copolymers or ASA copolymers. Other thermoplastic polymers may be present therein, but the above-described polymers or blends typically constitute the major proportion thereof.

Suitable polycarbonates include homo- and copolycarbonates comprising structural units of the formula

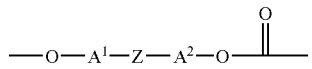

wherein each $A^1$ and $A^2$ is a monocyclic divalent aryl radical and Z is a bridging radical in which one or two carbon atoms separate $A^1$ and $A^2$. In particular, $A^1$ and $A^2$ may be unsubstituted phenylene or substituted derivatives thereof and the bridging radical Z may be methylene, cyclohexylidene or isopropylidene. More particularly, the polycarbonates may be bisphenol A polycarbonates. The polycarbonate may also be a copolyestercarbonate. Such polymers contain, in addition to the carbonate units, ester units containing -$A^1$-Z-$A^2$- moieties linked to aromatic dicarboxylate groups such as isophthalate and/or terephthalate. Suitable polyesters include poly(alkylene dicarboxylates), especially poly(ethylene terephthalate) (PET), poly(1,4-butylene terephthalate) (PBT), poly(trimethylene terephthalate) (PTT), poly(ethylene naphthalate) (PEN), poly(butylene naphthalate) (PBN), poly(cyclohexane dimethanol terephthalate), poly(cyclohexanedimethanol-co-ethylene terephthalate) (PETG), and poly(1,4-cyclohexanedimethyl-1,4-cyclohexanedicarboxylate) (PCCD).

Suitable polyarylates include structural units derived from aromatic dihydroxy compounds and aromatic dicarboxylic acid compounds, particularly from terephthalate and/or isophthalate structural units in combination with bisphenol A and/or resorcinol. Suitable polyetherimides are described in U.S. Pat. Nos. 3,803,085 and 3,905,942.

Blends of any of the foregoing polymers may also be employed. These include blends of thermoset polymers with thermoplastic polymers such as polyphenylene ether, polyphenylene sulfide, polysulfone, polyetherimide or polyester. The thermoplastic polymer is typically combined with thermoset monomer mixture before curing. Also included are blends of cellulosic materials and thermoset and/or thermoplastic polymers.

The substrate composed of polymeric materials may also incorporate fillers such as silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic.

The multilayer articles may be prepared by a variety of known processes such as coating from a solvent, film lamination, profile extrusion, sheet extrusion, coextrusion, extrusion blow molding and thermoforming, and injection molding. For example, the protective layer and substrate may be coextruded to form a multilayer article.

In some embodiments, the multilayer articles may additionally include a silicone hardcoat disposed on the protective layer. In this respect, MBL copolymers may be used as primers for a silicone hardcoat. The MBL copolymers for use with silicone hardcoats include structural units derived from other vinyl monomers in addition to those from MBL. Suitable vinyl monomers include (meth)acrylic acid and derivatives thereof, such as methyl methacrylate, ethyl acrylate, butyl acrylate, hydroxyethyl methacrylate, acrylonitrile, butyl methacrylate, isobutyl methacrylate, 2-ethylhexyl methacrylate, lauryl methacrylate, stearyl methacrylate, methyl acrylate, ethyl acrylate, n-butyl acrylate, t-butyl acrylate, -2-ethylhexyl acrylate, lauryl acrylate, hydroxyethyl acrylate, hydroxypropyl acrylate, hydroxypropyl methacrylate, acrylamide or methacrylamide, dimethylaminoethylacrylate and dimethylaminoethyl methacrylate, glycidyl acrylate and glycidyl methacrylate, and aromatic vinyl compounds, such as styrene, vinyl toluene, α-methyl styrene and t-butyl styrene. In particular, copolymers of MBL with methyl methacrylate, styrene, and/or acrylonitrile, including those described above, may be used.

There is no limitation with respect to the type of silicone hardcoats that may be used, other than that they adhere to the protective layer/primer. Therefore, coatings prepared from basic, neutral or acidic colloidal silica may be used. Examples of the silicone hardcoats that may be employed when the MBL copolymers are employed as protective layers/primers include those prepared by hydrolyzing an aqueous dispersion of colloidal silica and a trialkoxysilane or mixtures of trialkoxysilanes having the formula $RSi(OR)_3$, wherein each R is independently an alkyl group having 1 to 3 carbon atoms or a substituted or unsubstituted aromatic radical; preferably, a methyl group. The hardcoat may include conventional additives such as compatible ultraviolet light absorbing agents, and polysiloxane polyether copolymers. Other additives including thickening agents, pigments, and dyes may also be included for their conventionally employed purposes. A description of the preparation of suitable silicone hardcoats may be found in U.S. Pat. No. 4,373,061.

DEFINITIONS

In the context of the present invention, alkyl is intended to include linear, branched, or cyclic hydrocarbon structures and combinations thereof, including lower alkyl and higher alkyl. Preferred alkyl groups are those of $C_{20}$ or below. Lower alkyl refers to alkyl groups of from 1 to 6 carbon atoms, preferably from 1 to 4 carbon atoms, and includes methyl, ethyl, n-propyl, isopropyl, and n-, s- and t-butyl. Higher alkyl refers to alkyl groups having seven or more carbon atoms, preferably 7-20 carbon atoms, and includes n-, s- and t-heptyl, octyl, and dodecyl. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl Aryl and heteroaryl mean a 5- or 6-membered aromatic or heteroaromatic ring containing 0-3 heteroatoms selected from nitrogen, oxygen or sulfur; a bicyclic 9- or 10-membered aromatic or heteroaromatic ring system containing 0-3 heteroatoms selected from nitrogen, oxygen or sulfur; or a tricyclic 13- or 14-membered aromatic or heteroaromatic ring system containing 0-3 heteroatoms selected from nitrogen, oxygen or sulfur. The aromatic 6- to 14-membered carbocyclic rings include, for example, benzene, naphthalene, indane, tetralin, and fluorene; and the 5- to 10-membered aromatic heterocyclic rings include, e.g. imidazole, pyridine, indole, thiophene, benzopyranone, thiazole, furan, benzimidazole, quinoline, isoquinoline, quinoxaline, pyrimidine, pyrazine, tetrazole and pyrazole.

Arylalkyl means an alkyl residue attached to an aryl ring. Examples are benzyl and phenethyl. Heteroarylalkyl means an alkyl residue attached to a heteroaryl ring. Examples include pyridinylmethyl and pyrimidinylethyl. Alkylaryl means an aryl residue having one or more alkyl groups attached thereto. Examples are tolyl and mesityl.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxy-carbonyl, and benzyloxycarbonyl. Lower-acyl refers to groups containing one to four carbons.

Heterocycle means a cycloalkyl or aryl residue in which one to three of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran, triazole, benzotriazole, and triazine.

Substituted refers to structural units, including, but not limited to, alkyl, alkylaryl, aryl, arylalkyl, and heteroaryl, wherein up to three H atoms of the residue are replaced with lower alkyl, substituted alkyl, aryl, substituted aryl, haloalkyl, alkoxy, carbonyl, carboxy, carboxalkoxy, carboxamido, acyloxy, amidino, nitro, halo, hydroxy, $OCH(COOH)_2$, cyano, primary amino, secondary amino, acylamino, alkylthio, sulfoxide, sulfone, phenyl, benzyl, phenoxy, benzyloxy, heteroaryl, or heteroaryloxy; each of said phenyl, benzyl, phenoxy, benzyloxy, heteroaryl, and heteroaryloxy is optionally substituted with 1-3 substituents selected from lower alkyl, alkenyl, alkynyl, halogen, hydroxy, haloalkyl, alkoxy, cyano, phenyl, benzyl, benzyloxy, carboxamido, heteroaryl, heteroaryloxy, nitro or —NRR (wherein R is independently H, lower alkyl or cycloalkyl, and —RR may be fused to form a cyclic ring with nitrogen).

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

EXAMPLES

Example 1

Copolymer Synthesis

Materials: α-Methylene-γ-butyrolactone was obtained from TCI, and methyl methacrylate, styrene, acrylonitrile all from Aldrich. All were purified from inhibitors using a basic alumina column right before use.

General polymerization procedure: A vacuum flask was charged with the required amount of styrene, acrylonitrile, α-methylene-γ-butyrolactone, methyl methacrylate according to the target composition along with γ-butyrolactone as the solvent. AIBN was added as a radical initiator. Chain transfer agent can be added if desired. The concentration remained below 50%, preferable 30% to avoid a reaction exotherm. The flask was degassed twice through a freeze-thaw cycle, with a nitrogen purge when thawing. The heating oil bath temperature were kept at 65-70° C. for 4 hours and then cooled down to room temperature. The polymer sample was precipitated into methanol twice and dried in a low temperature vacuum oven overnight. The polymer compositions were determined by quantitative $C_{13}$ analysis.

Poly(styrene-co-acrylonitrile-co-methyl-methacrylate-co-α-methylene-γ-butyrolactone) were made in different ratios, with Mw ranging from 30 to 220 kDaltons. Compositions and molecular weights are shown in Table 1.

Molecular weight and polydispersity was determined relative to polystyrene standards on a Perkin Elmer Series 200 GPC equipped with a Polymer Laboratories size exclusion column (PLgel 5 μm MIXED-C, 300×7.5 mm kept at 40° C.) using chloroform with 3.6% v/v isopropanol as the mobile phase.

Tg was measured on a Perkin-Elmer DSC-7 with Pyris software. The typical DSC sample size was 5~10 mg and the DSC heating and cooling rates were 20° C./min. Results are shown in Table 1. Tg of polymers with about 20-30 mol % of α-methylene-γ-butyro-lactone was increased about 20-30% over compositions without -α-methylene-γ-butyro-lactone.

TGA Samples (3.5 to 7.0 mg) were tested in air using a Perkin Elmer TGA 7 under temperature scanning with a heating rates at 10° C./minute. The TGA analysis also showed that the copolymers were thermally stable up to at least 350° C.

TABLE 1

| Sample # | Compositions determined by NMR (Mass %) | | | | Product MW | | Tg, ° C. |
| --- | --- | --- | --- | --- | --- | --- | --- |
| | Styrene | Acrylonitrile | MMA | Tulipalin | Mw (K) | PDI | |
| 7 | 34.18 | 0.00 | 22.90 | 42.92 | 36.79 | 2.66 | 134.32 |
| 8 | 22.93 | 0.00 | 11.88 | 65.19 | 68.67 | 1.76 | 160.03 |
| 9 | 21.71 | 0.00 | 6.22 | 72.07 | 55.17 | 1.88 | 173.39 |
| 11 | 23.96 | 0.00 | 23.04 | 52.99 | 48.91 | 1.81 | 141.36 |
| 12 | 41.43 | 0.00 | 9.00 | 49.57 | 62.91 | 1.89 | 141.35 |
| 14 | 25.97 | 9.99 | 13.09 | 50.95 | 78.60 | 1.80 | 146.35 |
| 17 | 34.06 | 7.49 | 5.95 | 52.49 | 76.19 | 1.04 | 138.03 |
| 19 | 47.26 | 6.02 | 9.29 | 37.43 | 112.00 | 2.47 | 131.90 |
| 20 | 49.38 | 7.60 | 6.33 | 36.69 | 121.00 | 2.41 | 135.40 |
| 22 | 49.64 | 9.77 | 9.76 | 30.82 | 98.70 | 2.88 | 131.20 |
| 23 | 46.89 | 11.65 | 25.30 | 16.16 | 209.06 | 2.74 | 110 |
| 24 | 44.73 | 9.69 | 13.98 | 31.60 | 141.64 | 3.11 | 133 |
| 26 | 79.59 | 0.00 | 0.00 | 20.41 | 137.11 | 1.25 | 124 |
| 27 | 48.98 | 0.00 | 51.02 | 0.00 | 122.91 | 1.72 | 107 |
| 29 | 37.51 | 0.00 | 31.69 | 30.80 | 176.65 | 1.90 | 128 |
| 31 | 42.17 | 0.00 | 26.37 | 31.46 | 76.49 | 1.92 | 130 |
| 32 | 26.66 | 0.00 | 34.96 | 38.38 | 175.84 | 2.01 | 135 |
| 33 | 34.40 | 7.92 | 29.45 | 28.22 | 227.42 | 1.96 | 126 |
| 34 | 48.35 | 4.38 | 0.72 | 46.55 | 217.66 | 2.22 | 134 |
| 35 | 34.48 | 9.96 | 18.92 | 36.63 | 207.77 | 1.65 | 133 |
| 36 | 25.94 | 4.96 | 43.65 | 25.45 | 170.52 | 1.87 | 126 |
| 37 | 22.66 | 13.04 | 43.25 | 21.05 | 229.21 | 2.21 | 118 |
| 38 | 27.56 | 0.00 | 40.79 | 31.66 | 148.28 | 2.90 | 127 |
| 39 | 35.84 | 10.37 | 28.15 | 25.64 | 65.49 | 2.09 | 123 |
| 40 | 32.27 | 21.02 | 24.43 | 22.28 | 156.27 | 1.69 | 121 |
| 41 | 32.97 | 20.99 | 23.04 | 23.00 | 146.09 | 1.85 | 138 |
| 42 | 31.78 | 20.16 | 23.06 | 25.00 | 52.85 | 1.85 | 130 |
| 43 | 37.22 | 27.66 | 21.77 | 13.35 | 178.91 | 1.90 | 114 |
| 44 | 38.62 | 22.67 | 9.28 | 29.43 | 46.59 | 1.75 | 130.28 |
| 45 | 29.02 | 27.44 | 19.63 | 23.91 | 95.36 | 1.79 | 122.12 |
| MMASAN | 39.50 | 15.00 | 45.50 | 0.00 | 145.00 | 2.79 | 94 |

Example 2

Weatherability Determination

Polymer powder samples were compression molded into films about 100 microns thick, using Teflon coated aluminum foil as shim, a temperature of about 160° C., and a pressure of 4000 psi in a Carver press. The films were mounted on an aluminum frame and exposed in an Atlas Ci4000 xenon arc Weatherometer. The xenon arc lamp had a CIRA (IR-reflecting quartz) inner filter and a soda lime glass outer filter to best match sunlight. The samples were continuously irradiated (except for the spray period) at an irradiance of 0.75 W/m²/nm at 340 nm. The black panel temperature was 55° C. and the air temperature was 35° C. at a relative humidity of 30%. The samples received 30 minutes of water spray once per week.

Color measurements were made using a GretagMacbeth ColorEye 7000A spectrometer in transmission mode. Color is reported as Yellow Index according to ASTM D-1925. Results are shown in FIG. 1. All of the MBL copolymers yellowed less than commercial SAN, or MMASAN.

Example 3

Solvent Resistance

The films were tested for resistance to strong bases and organic solvents in comparison with SAN and MMASAN. MBL copolymer films were prepared using the procedure shown in Example 2. The film was placed in a crystallization dish and a drop (25 µL) of testing chemical was delivered onto the film surface by dispensing pipette. The dish with sample was placed in a oven at 65° C. for 1 hour. Pass and fail observation was made regarding whether there was visible damage to the film. Results are shown in Table 2. The MBL copolymers demonstrated improved chemical resistance.

TABLE 2

Solvent Resistance

| Sample # | 10% NaOH | Toluene |
|---|---|---|
| 22 | Pass | Pass |
| 29 | Pass | Pass |
| 33 | Pass | Pass |
| 34 | Pass | Pass |
| 35 | Pass | Pass |
| 36 | Pass | Pass |
| 37 | Pass | Pass |
| 38 | Pass | Pass |
| 40 | Pass | Pass |
| 41 | Pass | Pass |
| 43 | Pass | Pass |
| 44 | Pass | Pass |
| 45 | Pass | Pass |
| MMASAN | Pass | Fail |
| SAN | Pass | Fail |

Example 4

Multilayer Article

Preparation: For MMASAN 530, PMMA, SAN 581, and MBL (#33, #38, and #41) samples, a solution was made of 2.0 g of the caplayer polymer and 0.02 g TINUVIN® 1577 UV absorber (product of Ciba Specialty Chemicals) in 9 mL of chloroform. Compositions are displayed in Table 3.

TABLE 3

Compositions of Caplayer Polymers

| # | Composition by NMR, mass % | | | | molecular wt | Mw/Mn | Tg |
|---|---|---|---|---|---|---|---|
| | Styrene | Acrylonitrile | MMA | Tulipalin | kilodaltons | PDI | (° C.) |
| MMASAN 530 | 39.5 | 15 | 45.5 | 0 | 145 | 2.79 | 94 |
| PMMA (Elvacite ® 2041) | | | 100 | | | | ~95 |
| SAN 581 | 75 | 25 | | | | | ~100 |
| 33 | 34.4 | 7.92 | 29.45 | 28.22 | 227.42 | 1.96 | 126 |
| 38 | 27.56 | 0 | 40.79 | 31.66 | 148.28 | 2.9 | 127 |
| 45 | 29.02 | 27.44 | 19.63 | 23.91 | 95.36 | 1.79 | 122 |

MMASAN and SAN are Products of GE Advanced Materials
Elvacite 2041 is a Product of Lucite International The solution was poured onto a glass plate, drawn using a 10 mil doctor blade, and the solvent was allowed to evaporate. The film was floated from the glass using water and further dried for 2 hours at 65° C. in a forced air oven. The final films were approximately 40 microns thick. Portions of the films were laminated onto 2½"×2½"×⅛" plaques of LEXAN® 140 polycarbonate resin containing 2% titanium dioxide pigment. Lamination was done in a heated press at 165° C. using contact pressure for 3½ minutes followed by 4000 psi pressure for 1 minute, and 6000 psi pressure for ½ minute. The caplayers were firmly adhered to the polycarbonate surface. The sample with no caplayer was an unlaminated LEXAN® polycarbonate plaque.

Example 5

Toluene Resistance

A drop of toluene was placed on the surface of the sample at room temperature for one or two minutes then wiped off using a cotton swab. The surface was visually evaluated for damage and judged as either none, very slight, slight, severe, or very severe. Results are shown in Table 4. The results show that the tulipalin-containing samples have good to excellent resistance toward toluene while copolymers of styrene, acrylonitrile, and methyl methacrylate have very poor resistance.

TABLE 4

Toluene resistance and weathering data

| Composition of caplayer | Toluene Resistance | | Yellowing |
|---|---|---|---|
| | 1 min | 2 min | ΔYI at 2785 kJ |
| MMASAN 530 | severe | NA | 9.1 |
| PMMA | v. slight | slight | 2.6 |
| SAN 581 | severe | NA | 31.4 |
| 33 | v. slight | slight | 11.6 |
| 38 | v. slight | slight | 9.0 |
| 45 | none | none | 5.2 |
| none (PC control) | v. severe | NA | 20.4 |

Example 6

Accelerated Weathering of Multilayer Articles

Samples were exposed in an Atlas Ci35a xenon arc Weatherometer using the conditions shown in Table 5. Samples were removed after an exposure period of 2785 kJ/m²/nm measured at 340 nm. This amount of exposure is equivalent to approximately one year in Miami Fla. The color shift was measured on a Macbeth Coloreye 7000A spectrometer as the change in Yellowness Index (ΔYI) as defined by ASTM D1925. The results are shown in Table 4. They show that laminates made from the tulipalin-containing copolymers have smaller color shifts than the unlaminated polycarbonate, SAN laminate, and either better than or comparable to the MMASAN copolymer.

TABLE 5

Settings for weathering exposure

| Setting | Value |
| --- | --- |
| Irradiance | 0.77 W/m$^2$/nm at 340 nm |
| Cycle: | |
| light | 160 minutes |
| dark/dry | 5 minutes |
| dark/spray | 15 minutes |
| Black panel temp | 70° C. |
| Dry bulb temp | 45° C. |
| Relative humidity | 50% |
| Inner filter | Type S borosilicate |
| Outer filter | Type S borosilicate |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A copolymer comprising structural units derived from α-methylene-γ-butyrolactone, styrene, methyl methacrylate and acrylonitrile, wherein the copolymer has a glass transition temperature ranging from about 110° C. to about 175° C., and wherein said copolymer has better weatherability and better solvent resistance to toluene than a copolymer comprising structural units derived from styrene, methyl methacrylate and acrylonitrile and having no structural units derived from α-methylene-γ-butyrolactone.

2. The copolymer according to claim 1, having a glass transition temperature ranging from about 120° C. to about 150° C.

3. The copolymer according to claim 1, wherein the amount of structural units derived from α-methylene-γ-butyrolactone ranges from about 10% by weight to about 75% by weight.

4. The copolymer according to claim 1, wherein the amount of structural units derived from α-methylene-γ-butyrolactone ranges from about 20% by weight to about 50% by weight, based on total copolymer weight.

5. The copolymer according to claim 1, wherein the amount of structural units derived from styrene ranges from about 20% by weight to about 80% by weight, based on total copolymer weight.

6. The copolymer according to claim 1, wherein the amount of structural units derived from styrene ranges from about 20% by weight to about 50% by weight, based on total copolymer weight.

7. The copolymer according to claim 1, wherein the amount of structural units derived from styrene ranges from about 25% by weight to about 40% by weight, based on total copolymer weight.

8. The copolymer according to claim 1, wherein the amount of structural units derived from methyl methacrylate ranges from about 5% by weight to about 50% by weight, based on total copolymer weight.

9. The copolymer according to claim 1, wherein the amount of structural units derived from methyl methacrylate ranges from about 10% by weight to about 45% by weight, based on total copolymer weight.

10. The copolymer according to claim 1, wherein the amount of structural units derived from methyl methacrylate ranges from about 15% by weight to about 45% by weight, based on total copolymer weight.

11. The copolymer according to claim 1, wherein the amount of structural units derived from acrylonitrile ranges from about 5% by weight to about 40% by weight, based on total copolymer weight.

12. The copolymer according to claim 1, wherein the amount of structural units derived from acrylonitrile ranges from about 5% by weight to about 35% by weight, based on total copolymer weight.

13. The copolymer according to claim 1, wherein the amount of structural units derived from α-methylene-γ-butyrolactone ranges from about 10% by weight to about 75% by weight, the amount of structural units derived from styrene ranges from about 20% by weight to about 80% by weight, the amount of structural units derived from methyl methacrylate ranges from about 5% by weight to about 50% by weight, and the amount of structural units derived from acrylonitrile ranges from about 5% by weight to about 40% by weight, based on total copolymer weight.

14. The copolymer according to claim 1, wherein the amount of structural units derived from α-methylene-γ-butyrolactone ranges from about 20% by weight to about 50% by weight, the amount of structural units derived from styrene ranges from about 20% by weight to about 50% by weight, the amount of structural units derived from methyl methacrylate ranges from about 10% by weight to about 45% by weight, and the amount of structural units derived from acrylonitrile ranges from about 5% by weight to about 35% by weight, based on total copolymer weight.

15. A copolymer comprising structural units derived from 25-35% by weight α-methylene-γ-butyrolactone, 25-40% by weight styrene, 15-45% by weight methyl methacrylate and 5-35% by weight acrylonitrile, based on total copolymer weight, wherein the copolymer has a glass transition temperature ranging from about 110° C. to about 175° C., and wherein said copolymer has better weatherability and better solvent resistance to toluene than a copolymer comprising structural units derived from styrene, methyl methacrylate and acrylonitrile and having no structural units derived from α-methylene-γ-butyrolactone.

16. A method of improving the weatherability and solvent resistance of a copolymer composition, said copolymer comprising structural units derived from styrene, methyl methacrylate and acrylonitrile, said method comprising the step of including in the copolymer 25-35% by weight, based on total copolymer weight, of structural units derived from α-methylene-γ-butyrolactone, wherein said copolymer has better weatherability and better solvent resistance to toluene than a copolymer comprising structural units derived from styrene, methyl methacrylate and acrylonitrile and having no structural units derived from α-methylene-γ-butyrolactone.

* * * * *